Figure 3:
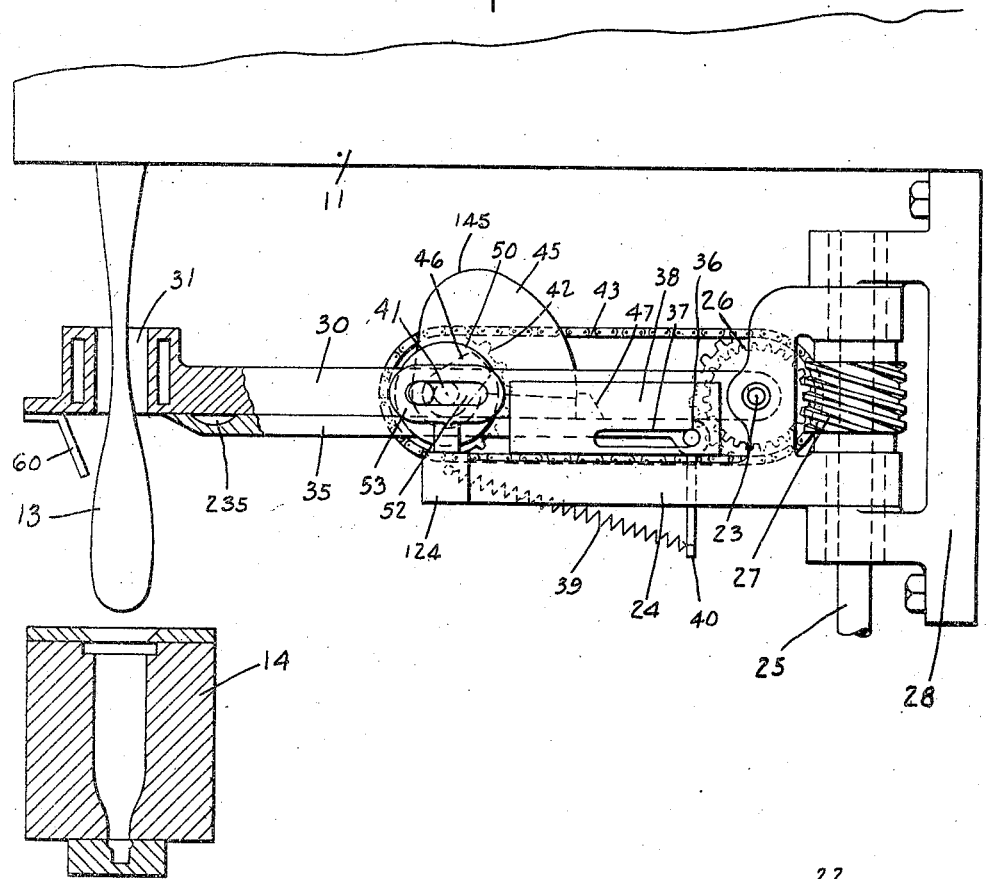

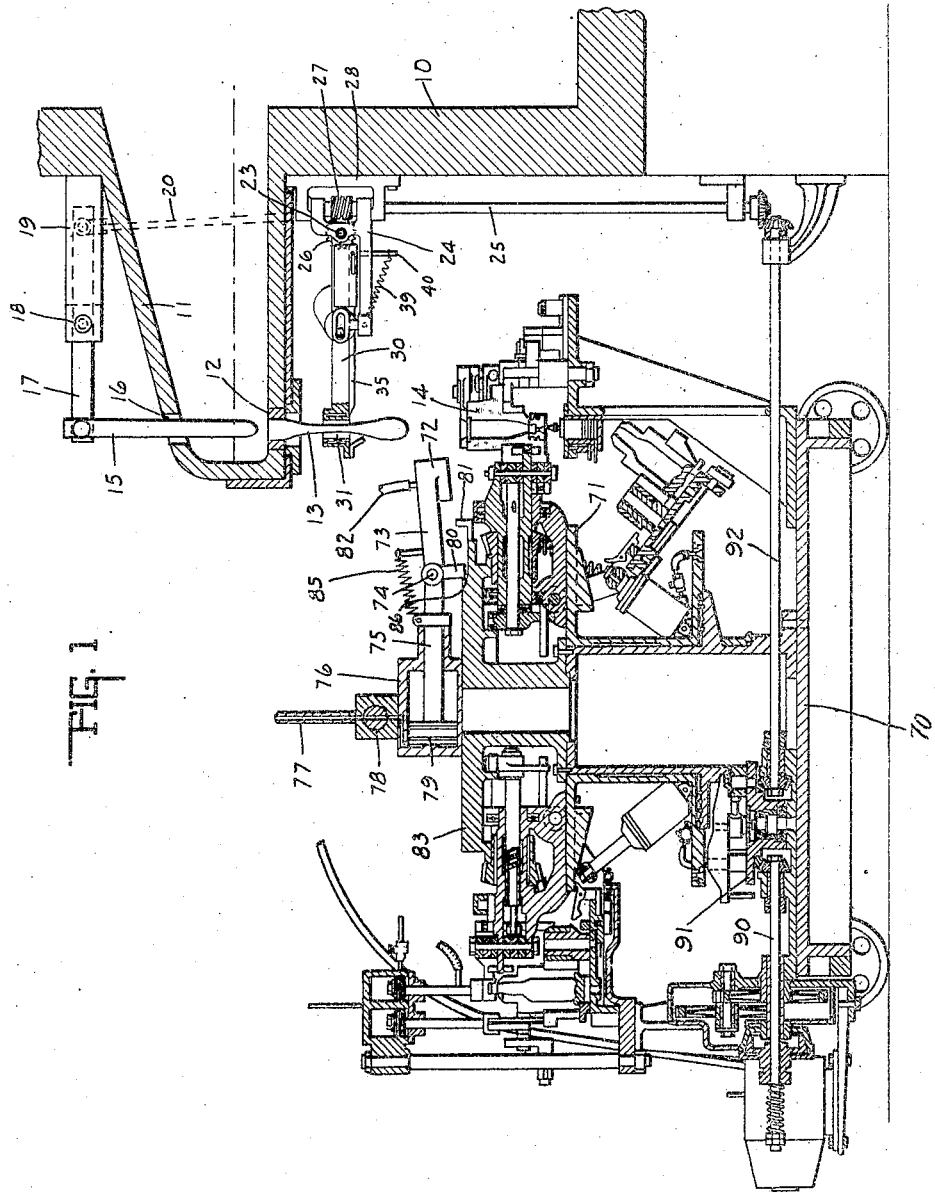

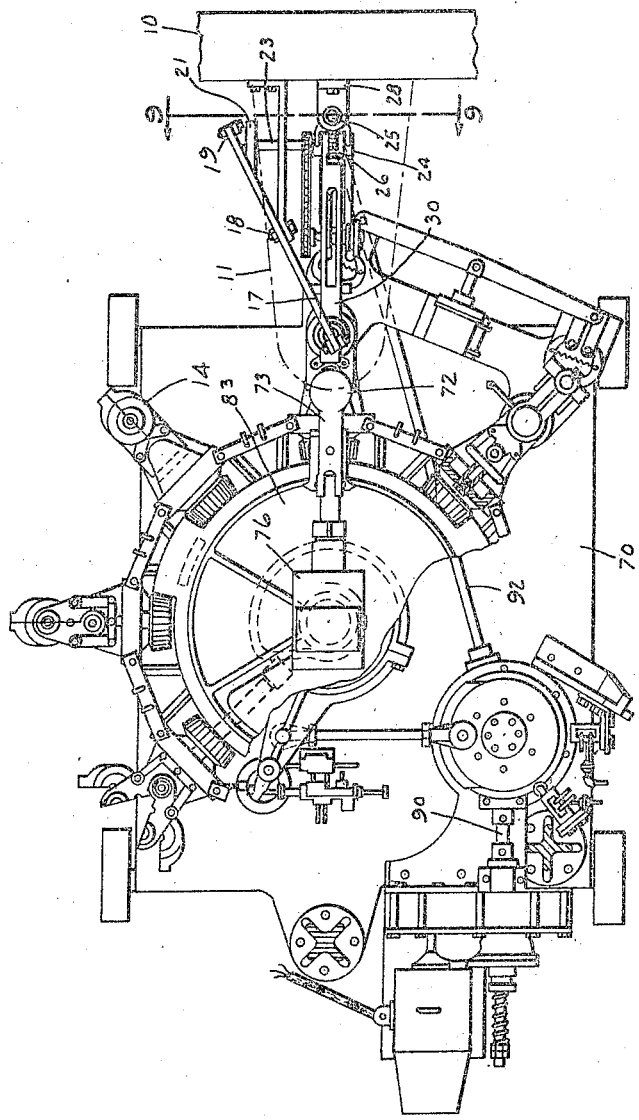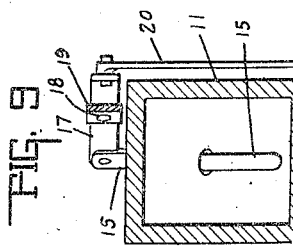

July 8, 1924.

E. MILLER 1,500,879

GLASS FEEDING MECHANISM

Filed Dec. 5, 1921   6 Sheets-Sheet 3

INVENTOR.
EDWARD MILLER
BY
ATTORNEYS

July 8, 1924. 1,500,879

E. MILLER

GLASS FEEDING MECHANISM

Filed Dec. 5, 1921 6 Sheets-Sheet 4

INVENTOR.
EDWARD MILLER
BY
ATTORNEYS

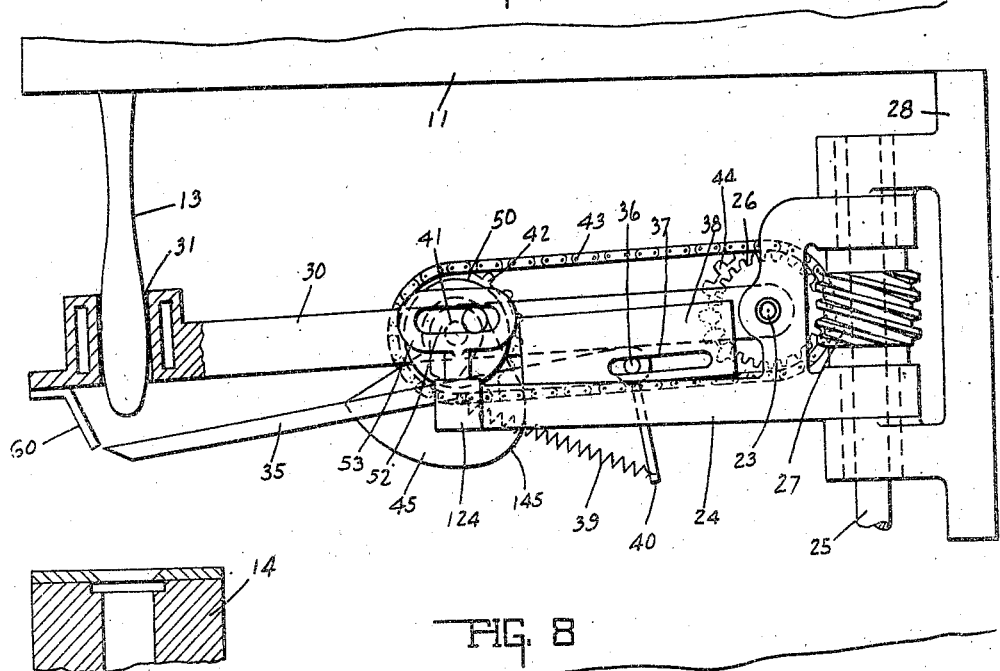
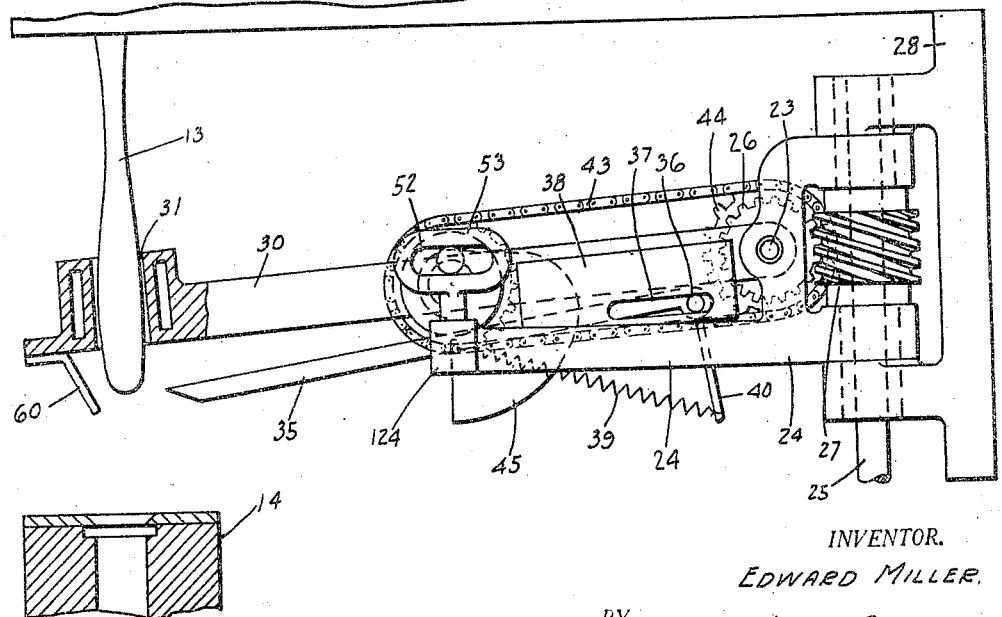

July 8, 1924.
E. MILLER
GLASS FEEDING MECHANISM
Filed Dec. 5, 1921   6 Sheets-Sheet 6
1,500,879
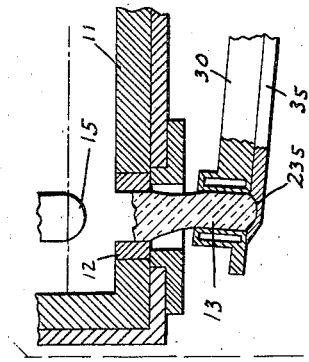
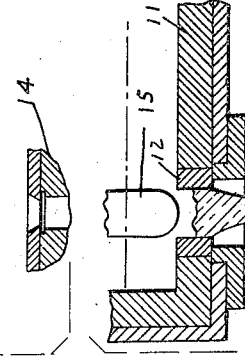
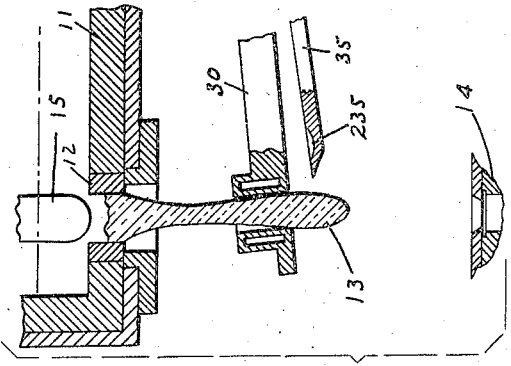
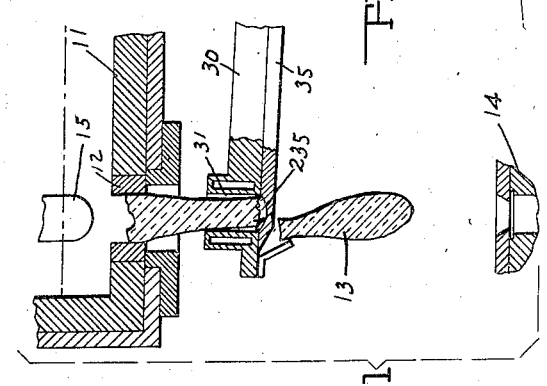
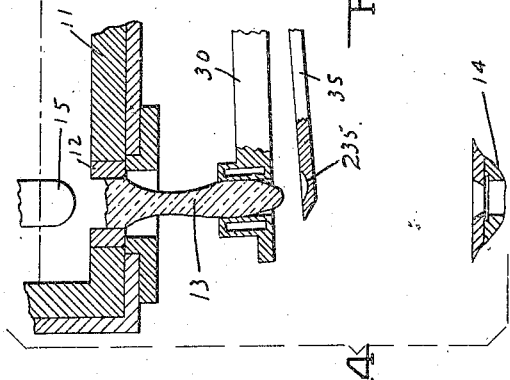
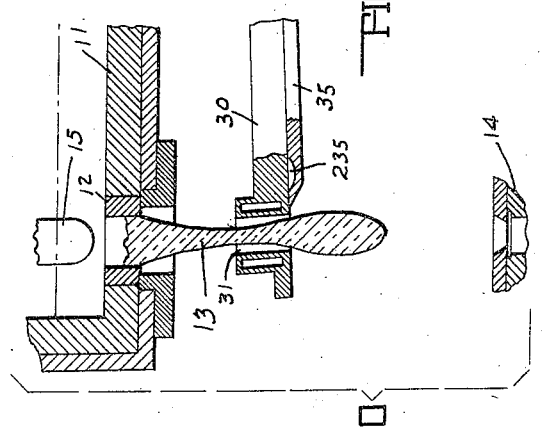
INVENTOR.
EDWARD MILLER
BY
ATTORNEYS Patented July 8, 1924.

1,500,879

UNITED STATES PATENT OFFICE.

EDWARD MILLER, OF COLUMBUS, OHIO, ASSIGNOR TO CHAPMAN J. ROOT, OF TERRE HAUTE, INDIANA.

GLASS-FEEDING MECHANISM.

Application filed December 5, 1921. Serial No. 519,968.

*To all whom it may concern:*

Be it known that I, EDWARD MILLER, a citizen of the United States, and a resident of Columbus, county of Franklin, and State of Ohio, have invented a certain new and useful Glass-Feeding Mechanism; and I do hereby declare that the following is a full, clear, and exact description thereof, reference being had to the accompanying drawings, in which like numerals refer to like parts.

The invention relates to means for improving and facilitating the feeding of glass from the spout of a glass tank to a glass making machine and the proper timing of the operation of the various parts of the machine and glass feeding or charging mechanism including the shearing or cut-off mechanism, in order that they may cooperate satisfactorily.

Therefore, one feature of the invention consists in the combination with the spout of a glass tank and a glass making machine so located with reference to the spout, substantially under it, that the glass may pass directly from the spout to the mold in the machine, and means for cutting off the glass and controlling its delivery from the spout to the mold so as to make it operate satisfactorily.

Another feature of the invention consists in the shear mechanism which not only cuts off the gather of glass, but temporarily receives and supports the remainder of the glass which has flowed from the spout of the tank so as to retain it and form it initially for constituting a part of the next gather of glass. In such mechanism there is a knife cooperating with the shear bar which has an opening through it for the glass to descend, and when the knife shears the glass, it closes the bottom of said opening and thereby forms a cup, and means to hold the knife temporarily in that position until the desired function has been accomplished before the knife begins to return to its inoperative position. To return the knife, it is first moved downward away from the glass retained in the cup of the shear bar. Also during the operation of temporarily holding the glass, the cutting mechanism is moved up closer to the discharge opening in the spout in order to receive the remaining glass and cause it to fill the cup, and as soon as this is accomplished and the knife begins to lower away from the shear bar through the shear bar opening by gravity to form the next gather, the shear bar is gradually moved downward, not only to normal position, but lower.

Another feature of the invention consists in combining with the above shearing mechanism, a needle or plug operating vertically in the spout for opening and substantially closing the discharge outlet therefrom, in timed relation with said shear mechanism. To that end the plug or needle is operated by the same means as operates the shear mechanism so as to bring about the properly timed operation thereof and enable the plug or needle to assist the shear mechanism in controlling the discharge of glass, particularly after the gather of glass has been severed.

Figure 4:
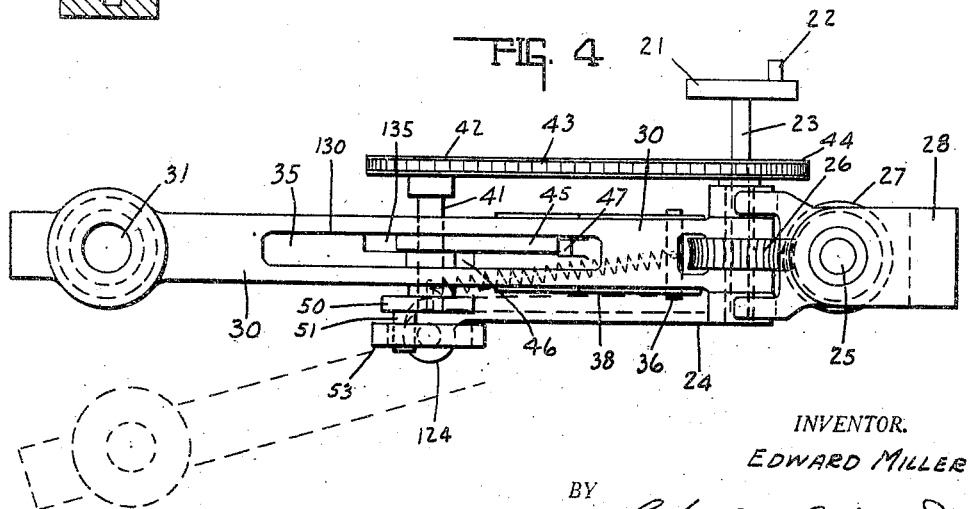
Figure 5:
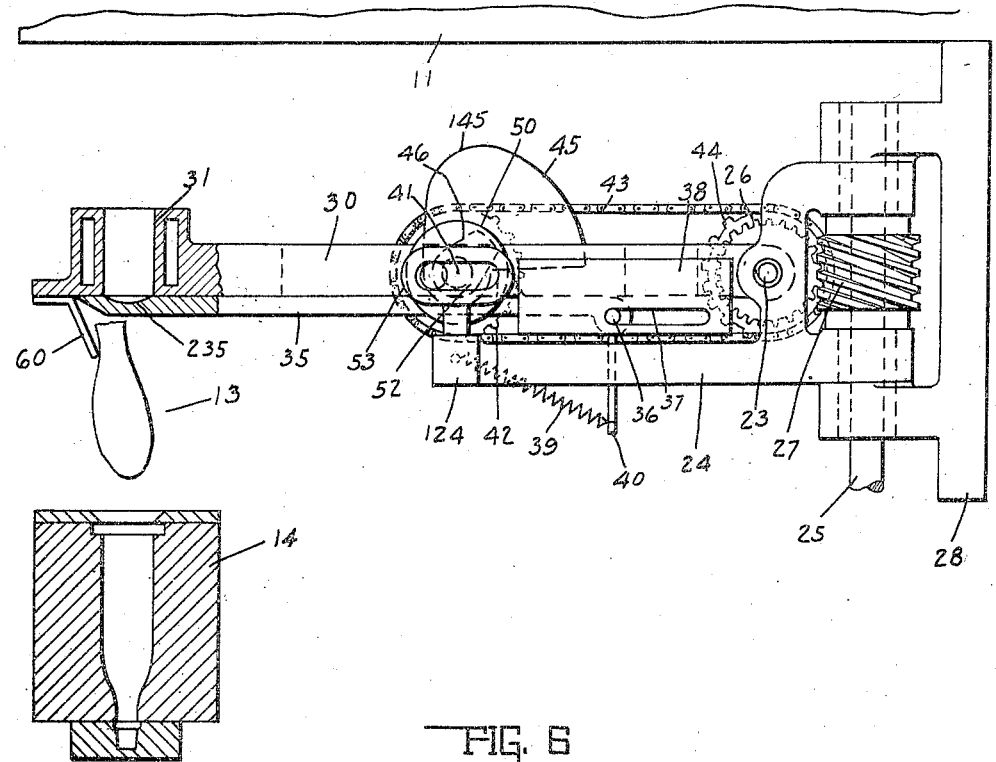
Figure 6:
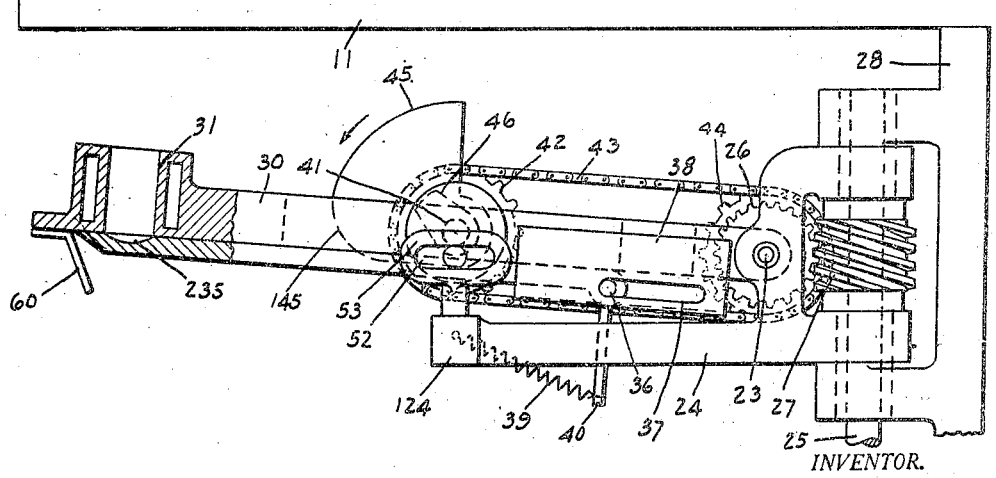

The full nature of the invention will be understood from the accompanying drawings and the following description and claims:

In the drawings, Fig. 1 is a central vertical section through a portion of a glass tank and its spout and associated glass feeding mechanism and a machine for making glassware associated therewith. Fig. 2 is a plan view of what is shown in Fig. 1. Fig. 3 is a vertical section of the shearing or cut-off mechanism and mold, as shown in Fig. 1, but on a larger scale. Fig. 4 is a plan view of what is shown in Fig. 2, an altered position of the shear frame being indicated by dotted lines. Fig. 5 is a side elevation of the shear mechanism shown in Fig. 3 with the parts in position after the shear or knife has been operated and the glass cut off, and a section of the mold. Fig. 6 is the same as Fig. 5 after the glass has been deposited in the mold, the lower part of the mold being broken away. Fig. 7 is the same as Fig. 3 with the parts in the stage of operation as the gather of glass is entering the shear or cut-off mechanism, the lower part of the mold being shown broken away. Fig. 8 is the same as Fig. 7 with the parts at the stage of operation subsequent to that shown in Fig. 7. Fig. 9 is a section on the line 9—9 of Fig. 2, showing parts of the device in elevation. Figs. 10 to 15 are diagrammatic vertical sections of the spout and means for controlling the discharge of glass, showing the parts in their various relative positions during the different stages of the operation, and the guide plates being omitted in all but Fig. 12.

There is shown in Fig. 1 a part of a glass tank 10 which may be of any desired construction, with its spout or boot 11 extending therefrom of any desired construction, a discharge opening 12 in the outer end thereof through which glass 13 flows or discharges and, when severed, enters a mold 14 of the glass machine.

The discharge opening 12 is substantially closed after each discharge of glass by a needle or plug 15 operating vertically through an opening 16 in the top of the spout or boot 11, so as to close and open the discharge opening. Said needle or plug is pivoted at its upper end to a lever or walking beam 17 and is fulcrumed between its ends at 18 to a fixed support 19. The lever or beam 17 is actuated by a connecting rod 20 pivoted at its upper end thereto.

The connecting rod 20 is actuated by an eccentric 21 having a pin 22 to which the lower end of the connecting rod 20 is pivoted. The eccentric 21 is secured on a shaft 23, seen in Figs. 2 and 9, and said shaft extends through a frame 24 that is mounted by upper and lower bearing arms on a vertical shaft 25 that at its upper end is mounted in two bearing arms on a frame 26 secured in fixed position, as shown in Fig. 1. The shaft 23 has on it a worm wheel 27 that meshes with a worm 28 on the shaft 25 so that said vertical shaft 25 drives the horizontal shaft 23 and through intermediate mechanism described operates the plug or needle 15.

The frame 24, mounted as explained above, is laterally oscillatory and carries a shear frame or bar 30 which is fulcrumed on the shaft 23 by a pair of divided arms lying on each side of the worm wheel 27, so that the shear frame has a vertical glass opening 31 directly under the glass discharge opening 12 of the spout 11 and the discharge or gather of glass 13 will pass through said opening. The shear or knife 35 lies under the shear frame 30, as seen in Fig. 3, and at one end is provided with a pair of laterally-extending pivot pins 36 that extend through horizontal slots 37 in plates 38 secured to the opposite sides of the shear frame 30. The knife is forced upwardly against the bottom of the shear frame by a spring 39 that extends from the lower end of a frame 40 rigidly connected with the knife 35 near its pivot and extending downwardly therefrom. The other end of the spring 39 is secured to some relatively stationary object, such as the end 124 of the horizontal oscillatory frame 24. The shear frame 30 is slotted at 130 vertically and longitudinally, and there is substantially a registering but narrower slot 135 in the cutter 35, as seen in Fig. 4. A shaft 41 extends transversely and horizontally through the shear arm 30 near the middle thereof and is driven by a sprocket wheel 42 secured thereon, a sprocket chain 43 and a sprocket 44 secured on the shaft 23. On said shaft 41 there is a cam 45 secured in position to operate in the slots 130 and 135 above described. The cam 45 is substantially triangular in shape with a rounded corner 145 and it rotates in the direction of the arrow.

Beside the cam 44 there is a smaller cam 46, as seen by dotted lines in Fig. 6. In fact, the two cams are preferably made integral, but the small cam operates only in the slot 130 of the shear arm 30. It does not register with the slot 135 in the knife 35, but as the cam is rotated, it engages the upper surface of the knife and forces it downward, as shown in Figs. 7 and 8. The function of the large cam 45 is to force the knife 35 rearwardly after the shearing operation. In its operation the periphery of the cam 45 engages the wall of the knife at the inner end of the slot 135 and the lug 47 extending upwardly from the knife at that point, as shown in Figs. 3 and 4. As the angular corner of the cam during its operation moves above and away from the lug 47, the knife is suddenly shot forward by the spring 39, from the position shown in Fig. 3 to the position shown in Fig. 6, thus severing the glass 13.

The end of the shaft 41 opposite the sprocket wheel 42 thereon has secured on it an eccentric consisting of a centrally mounted disk 50 with an eccentrically located pin 51 that projects through and operates in a horizontal slot 52 in a stationary frame or member 53 and is vertically adjustable in the end portion 124 of the laterally swinging frame 24. By this eccentric 50 and the parts described, the free end of the shearing mechanism is vertically moved in a suitable position, as shown in the drawings.

The operation of the shearing mechanism and the glass discharge mechanism will now be explained. Assuming the parts to be as shown in Fig. 1, the gather of glass 13 which has issued from the spout 11 and which extends through the hole 31 in the shear frame 30 is ready to be severed. A slightly further operation of the shaft 25 will cause the cam 45, which then is in the position shown in Fig. 3, to escape the lug 47 on the knife, and the spring 39 will force it outward from the position shown in Fig. 3 to that shown in Fig. 5, thus severing the glass. The gather of glass thus severed will fall down into the mold below. It is noted that the outer end of the knife 35 is made somewhat cup-shaped by a cylindrically curved surface or recess 235, shown in Fig. 3, which registers with the opening 31 in the shear arm 30, as seen in Fig. 5.

When the glass is being severed and immediately after it is severed, the glass is prevented from being forced by the knife out of line with the mold by an inclined guide plate 60 extending down from the ends of the shear frame, as shown. While the cam has been traveling from the position shown in Fig. 5 to that shown in Fig. 6, the knife remains unchanged, closing the bottom of the opening 31 through the shear head so that it will serve as a cup to receive and hold the glass above the knife and between the knife and the spout, as shown in Figs. 11 and 12, and during that period, the eccentric 50 and associated parts has been lifting the shear arm and knife from the position shown in Figs. 5 and 11 to that shown in Figs. 6 and 12.

During the next quarter of a revolution of the cam 45, the plug remains substantially closed and substantially prevents further discharge of the glass from the spout, as in Figs. 13 and 14. About midway between this last quarter of revolution of the cam 45, the knife and also the shear arm began to descend, the knife descending faster than the shear arm and at the end of the quarter of a revolution of the cam, said parts reach the position shown in Figs. 7 and 14. As the knife leaves the shear arm, the glass by gravity begins to protrude below the shear arm, as seen in Figs. 7 and 14.

At the beginning of the next quarter of a revolution of the cam 45, the knife is still lowered from the position shown in Fig. 4, and during the next quarter of a revolution of the cam, the knife is lifted against the bottom of the shear arm to the position shown in Figs. 5 and 10, and the glass has descended sufficiently far to be ready for another operation of the knife, and as the angular part of the cam 45 passes above the lug 47, the spring 39 again actuates the knife to sever the glass. This completes the cycle of operations of the machine.

While the plug 15 and associated mechanism for operating the same is here shown in combination with the shearing mechanism just described, the same is not necessary in actual practice, although it is preferable. In some situations and in working some kinds of glass, the shearing mechanism heretofore described is alone sufficient to handle the discharge of glass. In that case there is a continuous flow of glass from the spout and the shearing mechanism operates at times as a cup for holding the glass after there has been a severance; and when a sufficient amount of glass has been received by said cup, the knife descends and moves backward out of the way to permit the glass to feed downward until there is a sufficient amount of glass for another operation of the knife.

When the plug 15 is employed, it is preferably geared up with the means for actuating the shear mechanism as herein set forth and so as to operate in certain timed relation with the shear arm 30. Preferably the gearing of said parts is such that the plug 15 will operate in unison with the shear arm. Thus when the shear arm is in its lower position, as shown in Figs. 10 and 15, the plug is in its lower position and almost closes the outlet from the glass discharge spout. As the shear arm is elevated the plug 15 is correspondingly elevated, as seen in Figs. 11 to 13. This enables the plug to coact with the shear arm and the discharge opening of the spout in order to control the discharge of the glass under certain conditions. Hence, the sprocket wheels 26 and 42 are of the same diameter and the plug and shear arm are operated at the same speed.

Another feature of this invention consists in such a combinaton of the glass feeding mechanism heretofore described and the glass making machine so as to enable the latter to operate and control the operation of the former so that various parts of the mechanism will be timed in their operations. Thus there is shown herein a glass making machine 70 of familiar type having a rotary table 71 which carries a plurality of molds 14 and arranged so that in the rotation of the table, the molds will successively be brought under and in vertical alignment with the discharge opening 12 of the spout 11 and the opening 31 in the shear frame 30, whereby the charge of glass will descend by gravity, as it leaves the spout and the shear mechanism, into the mold beneath. The details of the construction of this glass making machine are unnecessary to be described, as the machine shown is of familiar type, set forth in Letters Patent No. 1,350,375, patented by me August 24, 1920. It is immaterial what the details of construction thereof are for operating the table and bringing the molds in succession to be placed to be charged. After glass has been received by the molds in machines of this kind, it is a practice to introduce air under pressure for flowing the glass down in a mold for forming the neck when the mold is arranged as herein shown. Herein there is shown a blow head 72 mounted on an arm 73 pivoted at 74 to a piston rod 75 in a cylinder 76 mounted on a stationary part 83 of the machine and supplied with air under pressure through the air supply to an air tube 77 and controlled by a valve 78. When air is introduced behind the piston 79, the mechanism described is forced outwardly radially until a projection 80 in the inner end of the arm 73 engages a fixed stop 81 on the stationary part 83 of the machine, which forces the blow head downward and horizontally upon the mold 14, and then the air enters the mold through a flexible tube 82, as is common in glass blowing machines. After said blowing operation is finished, the blow head is retracted by the spring 85 which at one end is connected to the blow head arm 73 and at the other end to the cylinder 76 and at the end of the retracted movement, the projection 80 comes in contact with the shoulder or stop 86 on the stationary part 83 of the machine, which forces the blow head up somewhat out of the way.

The table 71 of the said glass blowing machine is rotated by a shaft 90 which transmits power to a beveled gear on the underside of a plate 91 and power is transmitted from that shaft to a shaft 92 and to shaft 25 heretofore described. Plate 91 operates a pitman 191 that oscillates arm 291 that intermittently actuates the table. There is, therefore, a fixed relation between the means for rotating the glass machine table and operating the glass feeding mechanism whereby the mold 14 is brought into position for receiving the glass at the proper time, or the glass is severed and discharged at the proper time for the mold to receive the same. The means for controlling the air which operates the piston 79 is timed with the rotation of the table so that the blow head 72 will be brought into position on the mold 14 at the right time for blowing the same and the air will be shut off at the proper time for the blow head to be withdrawn.

The invention is not limited to the particular details of the construction herein set forth as there may be a wide modification in the construction of the glass blowing machine and also in some features of the glass feeding means. The novel features of the construction, however, are those set forth in the following claims.

The invention claimed is:

1. Means for controlling the discharge of glass from a glass tank spout, including a member having an opening through which the glass flows, a knife operating adjacent the underside of said member for severing the glass, and means for temporarily holding the knife in its actuated position for closing the lower end of said opening and thus forming a cup for temporarily receiving and holding the unsevered portion of the glass and subsequently lowering said knife from said member and returning it.

2. Means for controlling the discharge of glass from a glass tank spout, including a member having an opening through which the glass flows, a knife operating adjacent the underside of said member for severing the glass, and means for slowly removing the knife from its actuated position whereby a cup will be temporarily formed for receiving and holding the unsevered portion of the glass and subsequently lowering said knife from said member and returning it.

3. Means for controlling the discharge of glass from a glass tank spout, including a member having an opening through which the glass is adapted to flow, a knife operating adjacent the underside of said member and having a recess in the upper side of the knife adapted to register with the opening in said member after the knife has been actuated to close the bottom of said opening and form a cup, and means for temporarily holding the knife in its actuated position for receiving and holding the unsevered portion of the glass.

4. In apparatus of the kind described, a glass tank spout with a discharge opening in the bottom thereof, means mounted below the spout for severing the glass after it issues therefrom arranged to temporarily support the unsevered portion of the glass, and means for temporarily elevating the glass severing means towards the glass spout after the glass has been severed, substantially as and for the purpose set forth.

5. In apparatus of the kind described, a glass tank spout with a discharge opening in the bottom thereof, a knife for severing the glass, a shear arm mounted below the spout with an opening for the passage of the glass under the discharge opening from the spout and movable for registration of said opening, and means for mounting the knife reciprocally under said shear arm adapted to close the opening after the glass is severed and then to move from under said opening and downward from said shear arm.

6. In apparatus of the kind described, a glass tank spout with a discharge opening in the bottom thereof, a knife for severing the glass, a shear arm mounted below the spout under the discharge opening from the spout, and means for reciprocably mounting the knife on the underside of said shear arm in position to sever the glass and temporarily close the bottom of the opening through the shear arm to form a cup for temporarily supporting the unsevered portion of the glass and subsequently lowering said knife from said member and returning it.

7. In apparatus of the kind described, a glass tank spout with a discharge opening in the bottom thereof, a knife for severing the glass, a shear arm mounted below the spout under the discharge opening from the spout, means for reciprocably mounting the knife on the underside of said shear arm in position to sever the glass and temporarily close the bottom of the opening through the shear arm to form a cup for temporarily supporting the unsevered portion of the glass, and means for elevating the shear arm after the glass has been severed.

8. In apparatus of the kind described, a glass tank spout with a discharge opening in the bottom thereof, a knife for severing the glass, a shear arm mounted below the spout under the discharge opening from the spout, and means for mounting the knife reciprocably on the underside of said shear arm for severing the glass, said knife having a recess in the upper side thereof adapted to register with the opening through the shear arm after the glass has been severed and cooperating with the shear arm in forming a cup for temporarily receiving and holding the unsevered portion of the glass.

9. In apparatus of the kind described, a glass tank spout with a discharge opening in the bottom thereof, a shear arm mounted below the spout and having an opening through it registering with the opening in the spout, a knife reciprocably mounted on said shear arm for severing the glass, and means for lowering the shear arm as the glass descends from the spout.

10. In apparatus of the kind described, a glass tank spout with a discharge opening in the bottom thereof, a shear arm mounted below the spout and having an opening through it registering with the opening in the spout, a knife reciprocably mounted on said shear arm for severing the glass, and means for lowering the shear arm as the glass descends from the spout and for elevating the shear arm after the glass has been severed.

11. In apparatus of the kind described, a glass tank spout with a discharge opening in the bottom thereof, a knife for severing the glass, a shear arm mounted below the spout under the discharge opening from the spout, means for reciprocably mounting the knife on the underside of said shear arm in position to sever the glass and temporarily close the bottom of the opening through the shear arm to form a cup for temporarily supporting the unsevered portion of the glass, and means for lowering said shear arm as the glass descends and before it is severed and for elevating the same after the glass is severed.

12. In apparatus of the kind described, a glass tank spout with a discharge opening in the bottom thereof, a shear arm movably mounted below the spout and having an opening through it registering with the opening in the spout when the arm is moved into registering position, a knife reciprocably mounted on the underside of said shear arm for severing the glass, and means for holding the knife against the underside of said shear arm and reciprocating the same for severing the glass, and means which causes the knife to descend from the shear arm after it has severed the glass and retreat out of the path of the glass through the shear arm.

13. In apparatus of the kind described, a glass tank spout with a discharge opening in the bottom thereof, a shear arm mounted below the spout and having an opening through it registering with the opening in the spout, a knife reciprocably mounted on the underside of said shear arm for severing the glass, and means for holding the knife against the underside of said shear arm and reciprocating the same for severing the glass and which temporarily holds the knife in said position after the glass has been severed for temporarily supporting the unsevered portion of the glass and means which causes the knife thereafter to descend from the shear arm and retreat out of the path of the glass.

14. In apparatus of the kind described, a glass tank spout with a discharge opening in the bottom thereof, a shear arm mounted below the spout and having an opening through it registering with the opening in the spout, a knife reciprocably mounted on the underside of said shear arm for severing the glass, means for holding the knife against the underside of said shear arm and reciprocating the same for severing the glass and which temporarily holds the knife in said position after the glass has been severed for temporarily supporting the unsevered portion of the glass, means which causes the knife thereafter to descend from the shear arm and retreat out of the path of the glass, and a guide plate secured to said shear arm in position to be engaged by the glass as it is cut and descends to keep it in vertical alignment.

15. In apparatus of the kind described, a glass tank spout with a discharge opening in the bottom thereof, a shear arm mounted below the spout and having an opening through it registering with the opening in the spout, a knife mounted so as to be longitudinally reciprocable on the underside of said shear arm and having its forward end sharp for severing the glass, means for holding the knife against the underside of said shear arm and longitudinally moving the same forward for severing the glass and which permits the knife to temporarily close the bottom of the opening through the shear arm to form a cup for supporting the unsevered part of the glass, and means which causes the knife afterwards to descend from the shear arm and retreat out of the path of the glass.

16. In apparatus of the kind described, a glass tank spout with a discharge opening in the bottom thereof, a shear arm mounted below the spout and having an opening through it registering with the opening in the spout, a knife mounted so as to be longitudinally reciprocable on the underside of said shear arm and having its forward end sharp for severing the glass, means for holding the knife against the underside of said shear arm and longitudinally moving the same forward for severing the glass and which permits the knife to temporarily close the bottom of the opening through the shear arm to form a cup for supporting the unsevered part of the glass, means which causes the knife afterwards to descend from the shear arm and retreat out of the path of the glass, and a guide plate secured to the underside of the shear arm transversely thereof in position to engage the glass as it is cut and descends to keep it in vertical alignment.

17. In apparatus of the kind described, a glass tank spout with a discharge opening in the bottom thereof, a shear arm mounted below the spout, and having an opening through it registering with the opening in the spout, a knife reciprocably mounted on the underside of said shear arm for severing the glass, means for holding the knife against the underside of said shear arm and reciprocating the same for severing the glass and which temporarily holds the knife in said position after the glass has been severed for temporarily supporting the unsevered portion of the glass, means which causes the knife thereafter to descend from the shear arm and retreat out of the path of the glass, and means for elevating the shear arm while the knife is closing the bottom of the opening therethrough and for lowering the shear arm when the knife ceases to close the bottom of said opening.

18. In apparatus of the kind described, a glass tank spout with a discharge opening in the bottom thereof, a shear arm mounted below the spout and having an opening through it registering with the opening in the spout, a knife reciprocably mounted on the underside of said shear arm for severing the glass, means for holding the knife against the underside of said shear arm and reciprocating the same for severing the glass and which temporarily holds the knife in said position after the glass has been severed for temporarily supporting the unsevered portion of the glass, means which causes the knife thereafter to descend from the shear arm and retreat out of the path of the glass, and means for elevating the shear arm while the knife is closing the bottom of the opening therethrough and for lowering the shear arm when the knife ceases to close the bottom of said opening, and means for again elevating the shear arm when the knife has been moved up against the bottom of the shear arm before the glass is severed.

19. In apparatus of the kind described having a glass tank spout with a discharge opening in the bottom thereof, a glass severing means including a shear arm adapted to be mounted below said spout and having an opening through it registering with the opening in the spout, a knife reciprocably mounted on the underside of said shear arm for severing the glass, a spring connecting the shear arm and the knife for holding it against the underside of the shear arm and giving the knife its actuating movement, and means mounted in connection with the shear arm for returning the knife.

20. In apparatus of the kind described having a glass tank spout with a discharge opening in the bottom thereof, a glass severing means including a shear arm adapted to be mounted below said spout and having an opening through it registering with the opening in the spout, a knife reciprocably mounted on said shear arm for severing the glass, a spring connecting the shear arm and the knife for giving the latter its actuating movement, and a cam rotatably mounted in the shear arm in position to engage the knife and return it after it has severed the glass and permit the action of said spring when the glass is to be severed.

21. In apparatus of the kind described having a glass tank spout with a discharge opening in the bottom thereof, a glass severing means including a shear arm adapted to be mounted below said spout and having an opening through it registering with the opening in the spout, a knife reciprocably mounted on said shear arm for severing the glass, a spring connecting the shear arm and the knife for giving the latter its actuating movement, and a cam rotatably mounted on said shear arm and operatively engaging the knife and provided with a surface for depressing the knife after it has severed the glass and another surface for returning the knife and releasing it when the glass is to be severed.

22. In apparatus of the kind described having a glass tank spout with a discharge opening in the bottom thereof, a glass severing means including a shear arm adapted to be mounted below said spout and having an opening through it registering with the opening in the spout, a knife on said shear arm for severing the glass and having a longitudinal slot therethrough, a spring connecting the shear arm and said knife for giving the knife its severing movement, a shaft mounted transversely of said shear arm over the slot in said knife, and a cam arm secured on said shaft and extending into the slot in the knife and adapted to return the knife after it has severed the glass and to release the knife in order that it may be moved for severing the glass.

23. In apparatus of the kind described having a glass tank spout with a discharge opening in the bottom thereof, a glass-severing means including a shear arm adapted to be mounted below said spout and having an opening in the spout, a knife reciprocably mounted on said shear arm for severing the glass and having a longitudinal slot therethrough, a spring connecting the shear arm and said knife for giving the knife its severing movement, a shaft mounted transversely of said shear arm over the slot in said knife, a cam secured on said shaft and engaging the upper surface of the knife for depressing it after it has severed the glass, and another cam secured on said shaft and projecting into the slot in the knife for returning the knife after it has severed the glass and for releasing it to enable the spring to actuate the knife.

24. In apparatus of the kind described, a glass tank spout with a discharge opening in the bottom thereof, a shear arm below the spout and having an opening through it registering with the opening in the spout, a stationary frame below the spout on which the rear end of the shear arm is pivoted to enable the other end of the arm to have vertical movement, means for causing the vertical movement of said shear arm, a knife reciprocably mounted on said shear arm for severing the glass, and means for operating the knife which is controlled by the means for causing the vertical movement of the shear arm, substantially as set forth.

25. In apparatus of the kind described, a glass tank spout with a discharge opening in the bottom thereof, a shear arm below the spout and having an opening through it registering with the opening in the spout, a stationary frame below the spout on which the rear end of the shear arm is pivoted to enable the other end of the arm to have vertical movement, means for causing the vertical movement of said shear arm, a knife mounted on said shear arm so as to be longitudinally reciprocable for severing the glass and closing temporarily the glass opening through the shear arm, a spring for moving said knife in making the glass severing movement thereof, and means associated with the means for causing the vertical movement of the shear arm for causing the return movement of the knife.

26. In apparatus of the kind described, a glass tank spout with a discharge opening in the bottom thereof, a shear arm below the spout and having an opening through it registering with the opening in the spout, a stationary frame below the shear spout on which the rear end of the shear arm is pivoted to enable the other end of the arm to have vertical movement, means for causing the vertical movement of said shear arm, a knife mounted on said shear arm so as to be longitudinally reciprocable for severing the glass and closing temporarily the glass opening through the shear arm, a spring for moving said knife in making the glass severing movement thereof, and means associated with the means for causing the vertical movement of the shear arm for causing the downward and rearward return movement of said knife after the glass has been severed.

27. In apparatus of the kind described, a glass tank spout with a discharge opening in the bottom thereof, a shear arm below the spout and having an opening through it registering with the opening in the spout, a stationary frame below the spout on which the rear end of the shear arm is pivoted to enable the other end of the arm to have vertical movement, means for causing the vertical movement of said shear arm, a knife mounted on said shear arm so as to be longitudinally reciprocable for severing the glass and closing temporarily the glass opening through the shear arm, a spring for moving said knife in making the glass severing movement thereof, and a cam mounted in connection with the means for causing the vertical movement of the shear arm so as to be rotatable and give the knife its return movement after the glass has been severed.

28. In apparatus of the kind described, a glass tank spout with a discharge opening in the bottom thereof, a shear arm below the spout and having an opening through it registering with the opening in the spout, a stationary frame below the spout on which the rear end of the shear arm is pivoted to enable the other end of the arm to have vertical movement, means for causing the vertical movement of said shear arm, a knife mounted on said shear arm so as to be longitudinally reciprocable for severing the glass and closing temporarily the glass opening through the shear arm, a spring for moving said knife in making the glass severing movement thereof, and a cam mounted in connection with the means for causing the vertical movement of the shear arm so as to be rotatable and give the knife its return movement after the glass has been severed, said cam returning the knife rearward against the pull of said spring and arranged to release said knife at the time for severing the glass to enable the spring to cause the actuating movement thereof.

29. In apparatus of the kind described, a glass tank spout with a discharge opening in the bottom thereof, a shear arm below the spout and having an opening through it registering with the opening in the spout, a stationary frame below the spout on which the rear end of the shear arm is pivoted to enable the other end of the arm to have vertical movement, means for causing the vertical movement of said shear arm, a knife reciprocably mounted on said shear arm for severing the glass, a spring for moving said knife in making the glass severing movement thereof, and a cam rotatably mounted in connection with the means for vertically moving the shear arm and extending into the slot into the knife and shaped so that it will return the knife after it has severed the glass.

30. In apparatus of the kind described, a glass tank spout with a discharge opening in the bottom thereof, a shear arm below the spout and having an opening through it registering with the opening in the spout, a stationary frame below the spout on which the rear end of the shear arm is pivoted to enable the other end of the arm to have vertical movement, means for causing the vertical movement of said shear arm, a knife reciprocably mounted on said shear arm for severing the glass, a spring for moving said knife in making the glass severing movement thereof, a cam rotatably mounted in connection with the means for vertically moving the shear arm and extending into the slot into the knife and shaped so that it will return the knife after it has severed the glass, and another cam associated with said first cam for engaging the top of the knife and depressing it after it has severed the glass.

31. In apparatus of the kind described, a glass tank spout with a discharge opening in the bottom thereof, a shear arm below the spout and having an opening through it registering with the opening in the spout, a stationary frame below the spout on which the rear end of the shear arm is pivoted to enable the other end of the arm to have vertical movement, a shaft extending transversely through said shear arm between its ends, an eccentric secured on said shaft having a pin, a guide secured rigid to the means on which the shear arm is mounted and having a slot parallel with the shear arm in which said eccentric pin operates and whereby the shear arm is given vertical movement as the shaft is rotated, a knife mounted on said shear arm for severing the glass, and means for operating the knife which is controlled by the means for causing the vertical movement of the shear arm, substantially as set forth.

32. In apparatus of the kind described, a glass tank spout with a discharge opening in the bottom thereof, a shear arm below the spout and having an opening through it registering with the opening in the spout, a stationary frame below the spout on which the rear end of the shear arm is pivoted to enable the other end of the arm to have vertical movement, a shaft extending transversely through said shear arm between its ends, an eccentric secured on said shaft having a pin, a guide secured rigid to the means on which the shear arm is mounted and having a slot parallel with the shear arm in which said eccentric pin operates and whereby the shear arm is given vertical movement as the shaft is rotated, a knife mounted on said shear arm so as to be reciprocable for severing the glass and closing temporarily the glass opening through the shear arm, a spring for moving said knife in making the glass severing movement thereof, and means actuated by said shaft for causing the return movement of the knife after the glass has been severed.

33. In apparatus of the kind described, a glass tank spout with a discharge opening in the bottom thereof, a shear arm below the spout and having an opening through it registering with the opening in the spout, a stationary frame below the spout on which the rear end of the shear arm is pivoted to enable the other end of the arm to have vertical movement, a shaft extending transversely through said shear arm between its ends, an eccentric secured on said shaft having a pin, a guide secured rigid to the means on which the shear arm is mounted and having a slot parallel with the shear arm in which said eccentric pin operates and whereby the shear arm is given vertical movement as the shaft is rotated, a knife mounted in connection with the shear arm so as to have longitudinal movement for severing the glass and closing the bottom of the glass opening through the shear arm and having a longitudinal slot between its ends, a spring connecting the shear arm and knife for causing the shearing movement of the knife, and a cam secured on said shaft and operating in said slot in the knife for causing the return movement of the knife after the glass is severed.

34. In apparatus of the kind described, a glass tank spout with a discharge opening in the bottom thereof, a shear arm below the spout and having an opening through it registering with the opening in the spout, a stationary frame below the spout on which the rear end of the shear arm is pivoted to enable the other end of the arm to have vertical movement, a shaft extending transversely through said shear arm between its ends, an eccentric secured on said shaft having a pin, a guide secured rigid to the means on which the shear arm is mounted and having a slot parallel with the shear arm in which said eccentric pin operates and whereby the shear arm is given vertical movement as the shaft is rotated, a knife mounted in connection with the shear arm so as to have longitudinal movement for severing the glass and closing the bottom of the glass opening through the shear arm and having a longitudinal slot between its ends, a spring connecting the shear arm and knife for causing the shearing movement of the knife, a cam secured on said shaft for engaging the upper surface of the knife and depressing it after the glass has been severed, and another cam secured on said shaft and fitting into the slot in the knife and causing a return movement of the knife after it has been depressed.

35. The combination with the discharge spout of a glass tank having an outlet opening in the bottom thereof, of means for controlling the supply of glass therefrom, including a member movably mounted beneath the spout with the opening through it for the flow of glass, a knife mounted on and operating adjacent the underside of said member for severing the glass arranged so that when in severing position the knife will close the opening to form a cup for temporarily receiving and holding the unsevered portion of the glass, a vertically movable plug in the spout for controlling the outlet opening, and a common means for operating said parts so that as the knife reaches the severing position the knife holding member and the plug will be simultaneously moved upward.

36. The combination with the discharge spout of a glass tank having an outlet opening in the bottom thereof, of means for controlling the supply of glass therefrom, including a member movably mounted beneath the spout with an opening through it for the flow of glass, a knife mounted on and operating adjacent the underside of said member for severing the glass arranged so that when in severing position the knife will close the opening to form a cup for temporarily receiving and holding the unsevered portion of the glass, a vertically movable plug in the spout for controlling the outlet opening, and a common means for operating said parts so that as the glass flows from the tank and before it is severed, said knife holding member and said plug will be moved downwardly.

37. The combination with the discharge spout of a glass tank having an outlet opening in the bottom thereof, of means for controlling the supply of glass therefrom, including a member movably mounted beneath the spout with the opening through it for the flow of glass, a knife mounted on and operating adjacent the underside of said member for severing the glass arranged so that when in severing position the knife will close the opening to form a cup for temporarily receiving and holding the unsevered portion of the glass, a vertically movable plug in the spout for controlling the outlet opening, and a common means for operating said parts so that as the glass flows from the tank and before it is severed, said knife holding member and said plug will be moved downwardly, and a knife moved to position preparatory to severing the glass.

38. The combination with the discharge spout of a glass tank having an outlet opening in the bottom thereof, of means for controlling the supply of glass therefrom, including a member movably mounted beneath the spout with an opening through it for the flow of glass, a knife mounted on and operating adjacent the underside of said member for severing the glass arranged so that when in severing position the knife will close the opening to form a cup for temporarily receiving and holding the unsevered portion of the glass, means for moving the knife downward and out of the way of the flow of glass through the opening in said member after the glass has been severed to prepare for the next gather of glass, a vertically-movable plug in the spout for controlling the outlet of glass, and a common means for operating all of said parts so that as the gather of glass forms the knife-holding member and plug will gradually descend and the knife will be moved downward from the knife-holding member and out of the way of the gather of glass.

In testimony whereof, I have hereunto affixed my signature.

EDWARD MILLER.